(12) United States Patent
Nail

(10) Patent No.: US 10,033,425 B2
(45) Date of Patent: Jul. 24, 2018

(54) MULTIFUNCTION CONTROL RF ARRAY INTERFACE

(71) Applicant: L-3 Communications Corporation, New York, NY (US)

(72) Inventor: David Nail, Flower Mound, TX (US)

(73) Assignee: L-3 Communications Corporation, New York, NY (US)

( * ) Notice: Subject to any disclaimer, the term of this patent is extended or adjusted under 35 U.S.C. 154(b) by 0 days.

(21) Appl. No.: 14/992,502

(22) Filed: Jan. 11, 2016

(65) Prior Publication Data

US 2017/0201287 A1 Jul. 13, 2017

(51) Int. Cl.
  *H04B 1/401* (2015.01)
  *H04B 1/44* (2006.01)
  *H01Q 3/26* (2006.01)

(52) U.S. Cl.
  CPC ............ *H04B 1/401* (2013.01); *H04B 1/44* (2013.01); *H01Q 3/2617* (2013.01)

(58) Field of Classification Search
  CPC . H04B 1/40–1/48; H04B 7/04–7/0697; H01Q 3/26–3/42
  See application file for complete search history.

(56) References Cited

U.S. PATENT DOCUMENTS

| | | | |
|---|---|---|---|
| 5,491,831 A * | 2/1996 | Williams | H02P 5/00 340/12.5 |
| 6,441,783 B1 * | 8/2002 | Dean | G01S 7/032 342/372 |
| 6,822,531 B2 | 11/2004 | Carlson | |
| 2002/0001337 A1 * | 1/2002 | Chauncey | H04K 1/02 375/132 |
| 2005/0085267 A1 * | 4/2005 | Lemson | H04B 7/10 455/562.1 |
| 2007/0161348 A1 * | 7/2007 | Gribben | H04W 88/08 455/13.3 |
| 2012/0028690 A1 * | 2/2012 | Liu | H01Q 1/246 455/571 |

(Continued)

*Primary Examiner* — Gennadiy Tsvey
(74) *Attorney, Agent, or Firm* — Egan Peterman Enders Huston

(57) ABSTRACT

A control interface circuitry configured to control an array element of a phased array antenna system. The control interface circuitry comprises: 1) a first RF combiner network for transceiving first RF signals with first transmit/receive path circuitry in the array element; and 2) a central controller configured to communicate with control logic circuitry in the array element, the control logic circuitry controlling operation of the first transmit/receive path circuitry. During Data mode, the central controller transfers control data to the control logic circuitry via the first RF combiner network. During RF mode, the first RF combiner network transceives the first RF signals with the first transmit/receive path circuitry. The control interface circuitry further comprises: iii) a second RF combiner network for receiving second RF signals from second receive path circuitry in the array element. During Data mode, the central controller transfers a clock signal to the control logic circuitry via the second RF combiner network. During RF mode, the second RF combiner network receives the second RF signals from the second receive path circuitry.

26 Claims, 4 Drawing Sheets

(56) References Cited

U.S. PATENT DOCUMENTS

| | | | |
|---|---|---|---|
| 2012/0033559 A1* | 2/2012 | Kim | H04B 1/18 370/241 |
| 2012/0307695 A1* | 12/2012 | Yehezkely | H01P 5/20 370/310 |
| 2013/0083705 A1* | 4/2013 | Ma | H04B 7/024 370/280 |
| 2014/0148214 A1* | 5/2014 | Sasson | H01Q 1/3275 455/522 |
| 2015/0087248 A1* | 3/2015 | Yehezkely | H04B 1/0007 455/84 |
| 2015/0229396 A1* | 8/2015 | Lee | H04B 10/25753 398/115 |
| 2015/0380816 A1* | 12/2015 | Tajika | H01Q 1/1271 370/315 |
| 2016/0191133 A1* | 6/2016 | Noh | H04B 7/0617 370/329 |
| 2017/0170559 A1* | 6/2017 | van De Water | H01Q 3/36 |

* cited by examiner

MULTIFUNCTION CONTROL RF ARRAY INTERFACE

TECHNICAL FIELD

The present application relates generally to RF communication systems and, more specifically, to a phased array antenna system.

BACKGROUND

Phased array antennas are used to transmit and receive high gain, narrow beam, radio (RF) signals for communications and radar. Each antenna element of the array is fed with an RF path. The RF paths are combined together using an RF combiner network. To steer each beam, each transmit path and receive path includes one or more phase shifters and adjustable gain amplifiers. However, each phase shifter and amplifier must be controlled individually with calibrated values to direct the beam. Therefore, a large number of control signals are required for controlling each element of an array. This increases both the complexity and the cost of a printed circuit board in order to handle the large number of required control traces.

The typical control bus of a phased antenna array comprises a Clock line, a Data In line, a Data Out line, a Latch line, a Reset line, a transmit (TX) Enable line, and a receive (RX) Enable line. These control signals must be routed to every transmit/receive element of an array. The high-speed control signals (e.g., Clock, Data) are typically routed as differential pairs, which doubles the number of traces to be routed and adds routing constraints to control trace impedances. These signals require some level of noise immunity to protect the signals from noise sources within the printed circuit board. For example, the RF power ramp on/off and RF pulses may create detrimental transients in the control bus. If a single element is defective, it has the potential of disabling other elements. Reducing the large number of control signals would simplify the printed circuit board construction. This would reduce product development time and improve flexibility for implementing an RF array into different platforms.

Therefore, there is a need in the art for an improved RF phased antenna array. In particular, there is a need for an improved control interface for controlling multiple transmit/receive (TX/RX) elements of a phased antenna array.

SUMMARY

To address the above-discussed deficiencies of the prior art, it is a primary object to provide a control interface circuitry configured to control an array element of a phased array antenna system. In a preferred embodiment, the control interface circuitry comprises: 1) a first radio frequency (RF) combiner network configured to transmit first RF signals to and receive first RF signals from first transmit/receive path circuitry in the array element; and 2) a central controller configured to communicate with control logic circuitry in the array element, the control logic circuitry operable to control the operation of the first transmit/receive path circuitry of the array element. During Data mode, the central controller transfers control data to the control logic circuitry in the array element via the first RF combiner network. During RF mode, the first RF combiner network at least one of transmits first RF signals to or receives first RF signals from the first transmit/receive path circuitry in the array element.

In one embodiment, the control data comprises an input address associated with the control logic circuitry in the array element, wherein the control logic circuitry is configured to accept the control data as valid if the input address matches an embedded address associated with the array element.

In another embodiment, the control logic circuitry uses the valid control data to control the operation of the first transmit/receive path circuitry of the array element.

In still another embodiment, the central controller outputs a Mode control signal to the array element to switch the array element between Data mode and RF mode.

In yet another embodiment, the control interface circuitry further comprises: iii) a second RF combiner network configured to receive second RF signals from second receive path circuitry in the array element. During Data mode, the central controller transfers a clock signal to the control logic circuitry in the array element via the second RF combiner network. During RF mode, the second RF combiner network receives the second RF signals from the second receive path circuitry in the array element.

In a further embodiment, during RF mode, the central controller transfers a Transmit/Receive (TR) control signal to the array element. The array element uses the TR control signal to switch the operation of the first transmit/receive path circuitry of the array element between RF transmit operation and RF receive operation.

In a still further embodiment, the central controller transfers the TR control signal to the array element via the second RF combiner network.

In a yet further embodiment, the central controller outputs the Mode control signal to the array element via a single-ended signal line.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged phased array antenna system.

Figure 1:
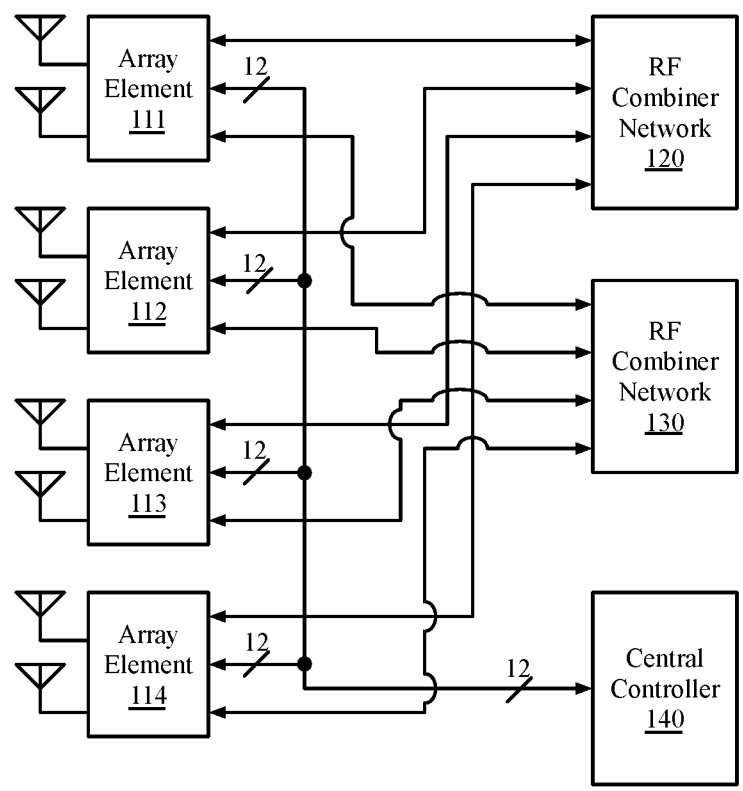
FIG. 1 illustrates a phased array antenna system according to one embodiment of the prior art.

FIG. 1 illustrates a phased array antenna system 100 according to one embodiment of the prior art. Phased array antenna system 100 comprises four (4) array elements 111-114, radio frequency (RF) combiner network 120, RF combiner network 130, and central controller 140. Each of array elements 111-114 has a receive path that is coupled to RF combiner network 130 and a transmit/receive path that is coupled to RF combiner network 120. In the exemplary embodiment, a twelve (12) signal line wide control bus couples each of array elements 111-114 to central controller 140. Because the 12-line control bus is routed to every element of the array from the central controller 140, this increases both the complexity and the cost of a printed circuit board in order to handle the large number of required control traces. The problem is further exacerbated if more than four array elements are implemented in system 100.

Figure 2:
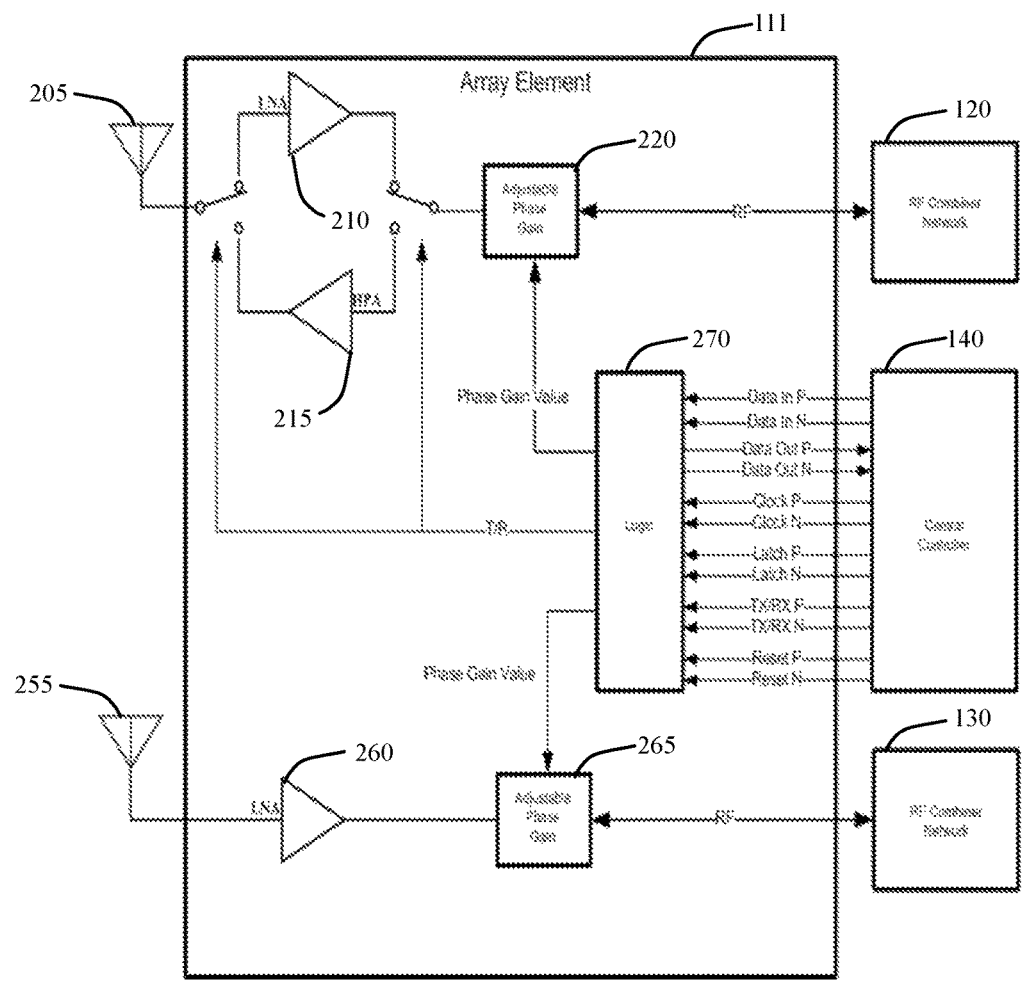
FIG. 2 illustrates a phased array antenna element according to one embodiment of the prior art.

FIG. 2 illustrates in greater detail array element 111 according to one embodiment of the prior art. For simplicity, array elements 112, 113, and 114 are omitted in FIG. 2. Array element 111 comprises a transmit/receive path that includes antenna 205, low noise amplifier (LNA) 210, high power amplifier (HPA) 215, and adjustable phase gain circuitry 220. Array element 111 further comprises a receive path that includes antenna 255, low noise amplifier (LNA) 260, and adjustable phase gain circuitry 265.

Array element 111 also comprises control logic circuitry 270 that controls the operation of the RF transmit/receive path and the RF receive path. In transmit mode, the T/R signal from control logic circuitry 270 causes two switches to couple antenna 205 to the output of HPA 215 and to couple the input of HPA 215 to adjustable phase gain circuitry 220. In transmit mode, an RF signal is input to adjustable phase gain circuitry 220 from RF combiner network 120. In receive mode, the T/R signal from control logic circuitry 270 causes the two switches to couple antenna 205 to the input of LNA 210 and to couple the output of LNA 210 to adjustable phase gain circuitry 220. In receive mode, an RF signal is output from adjustable phase gain circuitry 220 to RF combiner network 120. Control logic circuitry 270 also applies operating parameters, such as phase gain values, to adjustable phase gain circuitry 220 and 265.

FIG. 2 illustrates the complexity of the control signals that are applied from central controller 140 to control logic circuitry 270 in array element 111. Six (6) differential pair signals (12 signal lines total) are routed between central controller 140 and control logic circuitry 270. Each differential pair signal requires routing constraints to provide required impedance to support high-speed data. In the exemplary embodiment, the 6 differential pair signals are Data In P/N, Data Out P/N, Clock P/N, Latch P/N, TX/RX P/N, and Reset P/N.

Figure 3:
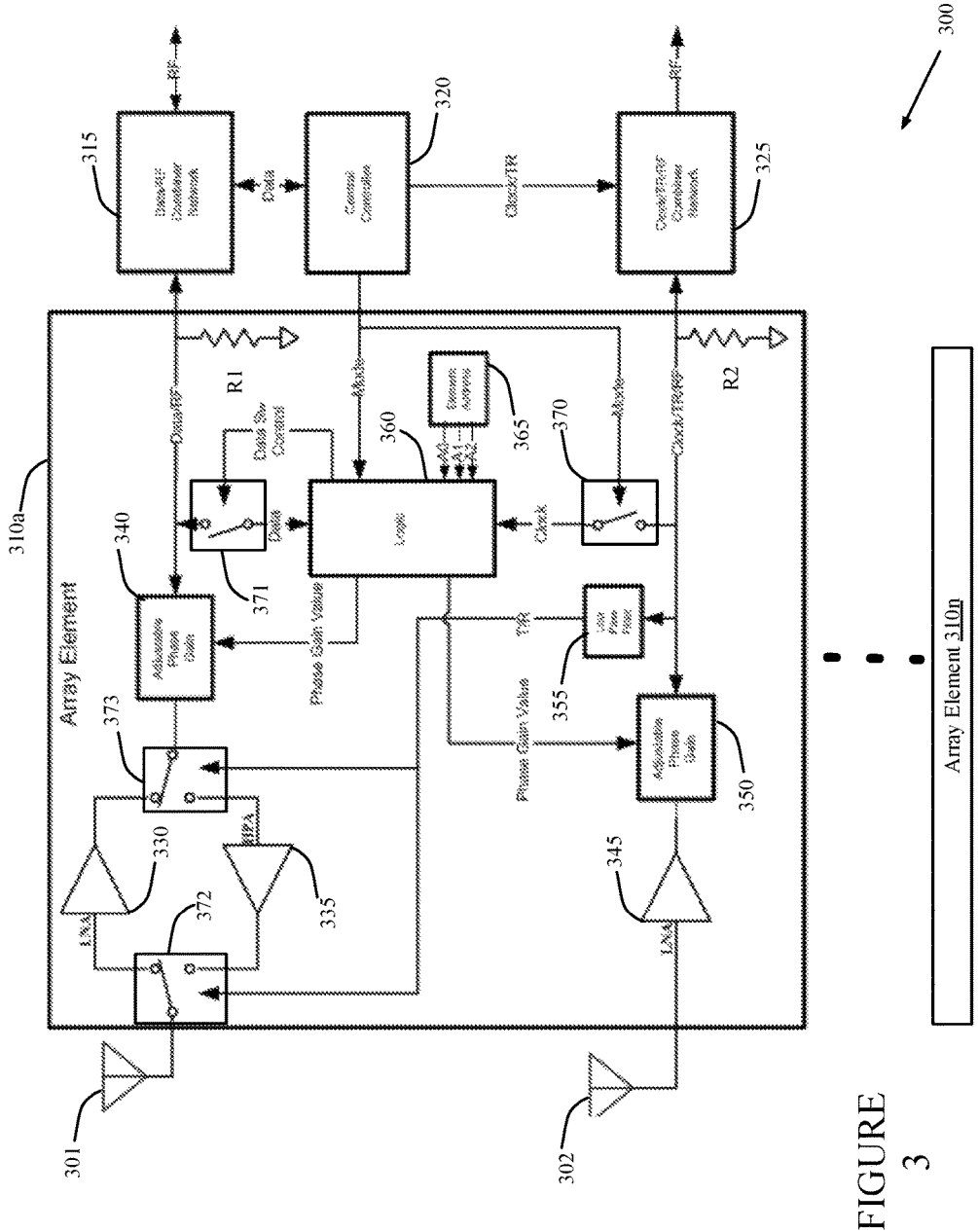
FIG. 3 illustrates a phased array antenna system according to one embodiment of the present disclosure.

FIG. 3 illustrates phased array antenna system 300 according to one embodiment of the present disclosure. Phased array antenna system 300 comprises N array elements 310a-310n, Data/RF combiner network 315, Clock/TR/RF combiner network 325, and central controller 320. For simplicity, only array element 310a is shown in detail in FIG. 3.

Array element 310a comprises first transmit/receive path circuitry that includes antenna 301, low noise amplifier (LNA) 330, high power amplifier (HPA) 335, switches 372 and 373, and adjustable phase gain circuitry 340. Array element 310a further comprises second receive path circuitry that includes antenna 302, low noise amplifier (LNA) 345, and adjustable phase gain circuitry 350. The operations of the first transmit/receive path circuitry and the second receive path circuitry are controlled by control logic circuitry 360, switches 370 and 371, low pass filter 355, and element address circuit 365.

Figure 4:
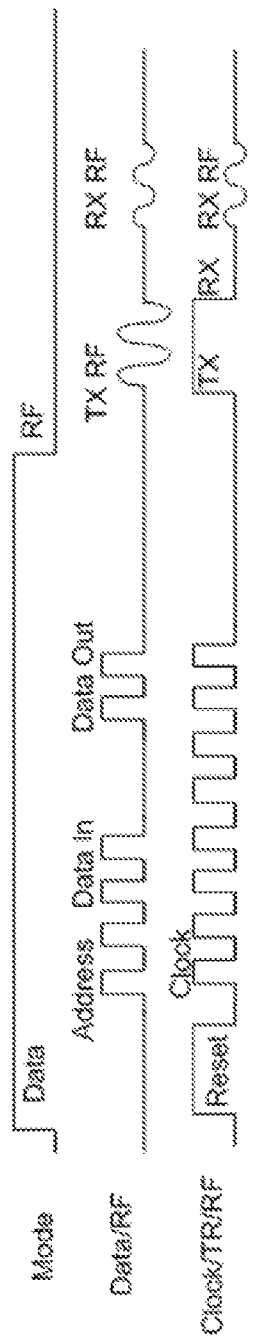
FIG. 4 is a timing diagram illustrating the operation of a phased array antenna system according to one embodiment of the present disclosure.

FIG. 4 is a timing diagram illustrating the operation of phased array antenna system 300 according to one embodiment of the present disclosure. Central controller 320 provides a Mode signal to control logic circuitry 360. In an exemplary embodiment, central controller 320 may comprise a microprocessor and a memory (e.g., microcontroller) that execute program instructions that control the overall functions of array elements 310a-n. Central controller 320 may be embodied in an application specific integrated circuit (ASIC) chip.

Among other things, the Mode signal controls switches 370 and 371 in order to provide control data, a Clock signal, and a Transmit/Receive (TR) signal to control logic circuitry 360. Central controller 320 provides the control data to Data/RF combiner 315, which transfers the control data to control logic circuitry 360 via switch 371 during Data mode. Central controller 320 provides the Clock signal to Clock/TR/RF combiner 325, which transfers the Clock signal to control logic circuitry 360 via switch 370 during Data mode. Finally, central controller 320 provides the TR control signal to Clock/TR/RF combiner 325, which transfers the TR control signal to switches 372 and 373 via low pass filter 355 during RF mode.

In Data mode, central controller 320 provides an Address and Data to Data/RF combiner network 315, which transfers the Data and Address on the Data/RF signal line to control logic circuitry 360 via switch 371. If the Address matches the internal address [A0:A2] from element address 365, then control logic circuitry 360 accepts the Data as valid. In like manner, central controller 320 can also read Data from control logic circuitry 360. During Data mode, central controller 320 provides a Clock signal to Clock/TR/RF combiner network 325, which transfers the Clock signal on the Clock/TR/RF signal line to control logic circuitry 360 via switch 370.

In RF transmit mode, the TR signal causes switches 372 and 373 to couple antenna 301 to the output of HPA 335 and to couple the input of HPA 335 to adjustable phase gain circuitry 340. In RF transmit mode, a TX RF signal is input to adjustable phase gain circuitry 340 from Data/RF combiner network 315. In RF receive mode, the TR signal causes switches 372 and 373 to couple antenna 301 to the input of LNA 330 and to couple the output of LNA 330 to adjustable phase gain circuitry 340. In RF receive mode, the RX RF signal is output from adjustable phase gain circuitry 340 to Data/RF combiner network 315. Control logic circuitry 360 also applies operating parameters, such as phase gain values, to adjustable phase gain circuitry 340 and 350.

An RF combiner network is typically optimized to perform at the RF and microwave frequencies of the communication or radar system. Many designs include Wilkinson combiners, which have quarter-wave transmission lines designed to provide the lowest loss over the RF center frequency and RF bandwidth of the system. In an advantageous embodiment of the present disclosure, RF combiner networks 315 and 325 are designed to provide a constant group delay at much lower frequencies, enabling RF combiner networks 315 and 325 to provide a high speed, single-ended control of RF phase shifters 340 and 350, adjustable gain amplifiers, and T/R switches of each array element 310 of the phased array antenna system 300.

The low speed Mode select signal may be used to select the function of the dual-purpose RF combiners 315 and 325 between Data and RF. When RF Mode is selected, the Data into each of array elements 310a-310n is isolated to provide noise immunity. A broadband 50-ohm termination is provided at each array element 310 by resistors R1 and R2. This allows even a nonfunctional array element 310 to properly terminate the RF combiner networks 315 and 325.

To eliminate a separate Latch signal, each transmit/receive array element 310 has a hardwired address [A0-A2] in element address 365, so that each array element 310 only stores data specific to that array element 310. When control logic circuitry 360 is enabled by the Mode signal, the serial Address input is compared to the hardwired Element Address 365. If the addresses are different, then control logic circuitry 360 does not respond to the Data In and after X clock cycles, data switch 371 is opened to isolate the RF/Data bus. Data switch 371 and clock switch 370 also provide isolation from control logic circuitry 360 noise during RF receive (RX) operations, as well as noise immunity to control logic circuitry 360 input during RF transmit (TX) operations.

A multifunction control RF array interface may be implemented in different ways. For example, if two RF combiner networks are available in a dual polarity antenna array system 300, then one RF combiner is used for Data and the second RF combiner is used as the data Clock. If only one RF combiner network is available, then a single wire interface may be implemented in which the data clock is encoded into the serial data bits.

Array element 310a may be reset to a default state by setting both the Mode signal and the Clock signal to a high level for a time duration equivalent to several clock periods, as required by the implementation of the RESET circuitry in element 310a. Alternatively, a separate low speed, single ended RESET line may be implemented. In a Data Out operation, if array element 310a is addressed, then after X clock cycles, array element 310a writes data out on Data/RF combiner network 315.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A control interface circuitry configured to control multiple array elements that are each separately coupled to a different antenna of a phased array antenna system, the control interface circuitry comprising:
   a first radio frequency (RF) combiner network configured to transmit first RF signals to and receive first RF signals from separate first transmit/receive path circuitry present in each of the different array elements and that is separately coupled to an antenna that is different than an antenna coupled to the first transmit/receive path circuitry of each of the other array elements; and
   a central controller configured to communicate with separate control logic circuitry present in each of the different array elements, the control logic circuitry of each different given array element being operable to control operation of the separate first transmit/receive path circuitry of the same given array element;
   wherein the central controller transfers control data to the separate control logic circuitry present in each different array element via the first RF combiner network and wherein the first RF combiner network at least one of transmits first RF signals to or receives first RF signals from the first transmit/receive path circuitry present in each different array element; and
   where the first RF combiner network has a RF and data signal input/output configured to exchange the first RF signals and the control data with the different array elements, a data signal input/output coupled to exchange the control data with the central controller, and a RF input/output coupled to output the first RF signals from the first RF combiner network that are received from the different array elements and to receive the first RF signals that are provided to the different array elements; and where the first RF combiner network is configured to provide constant group delay for the control data exchanged with the different array elements.

2. The control interface circuitry of claim 1, wherein the central controller transfers control data individually to the different separate control logic circuitry present in each different respective one of the multiple different array elements via the first RF combiner network and wherein the first RF combiner network at least one of transmits first RF signals to or receives first RF signals from the first transmit/receive path circuitry present in each different array element.

3. The control interface circuitry as set forth in claim 1, wherein a different embedded input address is associated with a control logic circuitry of each different array element; wherein the control data comprises input address information to address the control data to the control logic circuitry of the different array elements, and wherein the control logic circuitry of each different given array element is configured to accept the control data as valid if the input address matches an embedded address associated with the given array element; and wherein the control logic circuitry of each different given array element uses the valid control data to control operation of the first transmit/receive path circuitry of the given array element.

4. The control interface circuitry as set forth in claim 3, wherein, during a Data mode, the central controller transfers the control data to the separate control logic circuitry present in each of the different array elements via the first RF combiner network; wherein, during a RF mode, the first RF combiner network at least one of transmits the first RF signals to or receives the first RF signals from the first transmit/receive path circuitry present in each of the different array elements; and wherein the central controller outputs a Mode control signal to each different given array element to switch the given array element between Data mode and RF mode.

5. The control interface circuitry as set forth in claim 4, wherein the control interface circuitry further comprises:
a second RF combiner network configured to receive second RF signals from separate second receive path circuitry present in each of the different array elements and that is separately coupled to an antenna that is different than an antenna coupled to the second receive path circuitry of each of the other array elements;
wherein, during Data mode, the central controller transfers a clock signal to the separate control logic circuitry present in each of the different array elements via the second RF combiner network and wherein, during RF mode, the second RF combiner network receives the second RF signals from the second receive path circuitry present in each of the different array elements.

6. The control interface circuitry as set forth in claim 5, wherein during RF mode, the central controller transfers a Transmit/Receive (TR) control signal to each different given array element, wherein each different given array element uses the TR control signal to switch operation of the first transmit/receive path circuitry of the given array element between RF transmit operation and RF receive operation.

7. The control interface circuitry as set forth in claim 6, wherein the central controller transfers the TR control signal to each different given array element via the second RF combiner network.

8. The control interface circuitry as set forth in claim 6, wherein the central controller outputs the Mode control signal to each different given array element via a single-ended signal line.

9. The control interface circuitry as set forth in claim 6, wherein first RF combiner network transfers the control data and the first RF signals to each different given array element via a single-ended signal line.

10. The control interface circuitry as set forth in claim 6, wherein the second RF combiner network transfers the clock signal and the TR control signal to each different given array element via a single-ended signal line.

11. The control interface circuitry as set forth in claim 1, where the control interface circuitry is coupled to control the multiple array elements of the phased array antenna system; and where each of the multiple array elements is separately coupled to an antenna that is different than an antenna coupled to any of the other multiple array elements.

12. A system comprising control interface circuitry coupled to an array element for use in a phased array antenna system that includes multiple separate array elements coupled to different antennas, where the control interface circuitry is configured to control multiple array elements that are each separately coupled to a different antenna of a phased array antenna system, the control interface circuitry comprising:
a first radio frequency (RF) combiner network configured to transmit first RF signals to and receive first RF signals from separate first transmit/receive path circuitry present in each of the different array elements and that is separately coupled to an antenna that is different than an antenna coupled to the first transmit/receive path circuitry of each of the other array elements; and
an external central controller configured to communicate with separate control logic circuitry present in each of the different array elements, the control logic circuitry of each different given array element being operable to control operation of the separate first transmit/receive path circuitry of the same given array element;
wherein the central controller transfers control data to the separate control logic circuitry present in each different array element via the first RF combiner network and wherein the first RF combiner network at least one of transmits first RF signals to or receives first RF signals from the first transmit/receive path circuitry present in each different array element; and
where the first RF combiner network has a RF and data signal input/output configured to exchange the first RF signals and the control data with the different array elements, a data signal input/output coupled to exchange the control data with the central controller, and a RF input/output coupled to output the first RF signals from the first RF combiner network that are received from the different array elements and to receive the first RF signals that are provided to the different array elements; and where the first RF combiner network is configured to provide constant group delay for the control data exchanged with the different array elements; and
where the array element comprises:
first transmit/receive path circuitry configured to be separately coupled to an antenna that is different than an antenna coupled to the first transmit/receive path circuitry of each of the other array elements, the first transmit/receive path circuitry being configured to transmit first RF signals to and receive first RF signals from the first radio frequency (RF) combiner network of the control interface circuitry, and
control logic circuitry configured to communicate with the external central controller of the control interface circuitry, wherein the control logic circuitry is configured to control operation of the first transmit/receive path circuitry of the array element;
wherein the control logic circuitry receives control data from the central controller via the first RF combiner network and wherein the first transmit/receive path circuitry at least one of transmits the first RF signals to or receives the first RF signals from the first RF combiner network.

13. The system as set forth in claim 12, wherein an embedded input address is associated with the control logic circuitry of the array element that is different than an embedded input address associated with control logic circuitry of any other array element of the same phased array system; wherein the control data comprises input address information to address the control data to the control logic circuitry of the array element and wherein the control logic circuitry is configured to accept the control data as valid if the input address matches an embedded address associated with the array element; wherein, during a Data mode, the control logic circuitry receives control data from the central controller via the first RF combiner network; wherein, during a RF mode, the first transmit/receive path circuitry at least one of transmits the first RF signals to or receives the first RF signals from the first RF combiner network; and wherein the control logic circuitry uses the valid control data to control operation of the first transmit/receive path circuitry of the array element.

14. The system as set forth in claim 13, wherein the array element receives from the external central controller a Mode control signal that switches the array element between Data mode and RF mode.

15. The system as set forth in claim 14, further comprising:
second receive path circuitry configured to be separately coupled to an antenna that is different than an antenna coupled to the second receive path circuitry of each of the other array elements, the second receive path circuitry being configured to transmit second RF signals to a second radio frequency (RF) combiner network,
wherein the control logic circuitry is configured to control operation of the second receive path circuitry of the array element and wherein the control logic circuitry receives from the external central controller a clock signal via the second RF combiner network and wherein the second receive path circuitry transmits the second RF signals to the second RF combiner network.

16. The system as set forth in claim 15, wherein during RF mode, the array element receives a Transmit/Receive (TR) control signal from the external central controller, wherein the array element uses the TR control signal to switch operation of the first transmit/receive path circuitry of the array element between RF transmit operation and RF receive operation.

17. The system as set forth in claim 16, wherein the external central controller transfers the TR control signal to the array element via the second RF combiner network.

18. The system as set forth in claim 16, wherein the array element receives the Mode signal via a single-ended signal line.

19. The system as set forth in claim 16, wherein the array element receives the control data and the first RF signals via a single-ended signal line.

20. The system as set forth in claim 16, wherein the array element receives the clock signal and the TR control signal via a single-ended signal line.

21. The system as set forth in claim 12, where the array element is coupled to an antenna that is not coupled to any other array element.

22. A phased array antenna system comprising multiple separate array elements, each of the multiple separate array elements comprising an array element of the system as set forth in claim 12, where the array element is coupled to an antenna that is not coupled to any other array element.

23. The phased array antenna system of claim 22, where the first transmit/receive path circuitry of each array element is separately coupled to an antenna that is different than an antenna coupled to the first transmit/receive path circuitry of each of the other array elements, the first transmit/receive path circuitry being configured to transmit first RF signals to and receive first RF signals from the first radio frequency (RF) combiner network coupled to the array element; where the control logic circuitry of each array element is coupled to communicate with the external central controller, the control logic circuitry of each given array element being configured to control operation of the first transmit/receive path circuitry of the given array element; and where the control logic circuitry of each array element is coupled to receive the control data from the central controller via the first RF combiner network; and where the first transmit/receive path circuitry of each array element at least one of transmits the first RF signals to or receives the first RF signals from the first RF combiner network.

24. An array element for use in a phased array antenna system that includes multiple separate array elements coupled to different antennas, the array element comprising:
first transmit/receive path circuitry configured to be separately coupled to an antenna that is different than an antenna coupled to the first transmit/receive path circuitry of each of the other array elements, the first transmit/receive path circuitry being configured to transmit first RF signals to and receive first RF signals from a first radio frequency (RF) combiner network;
control logic circuitry configured to communicate with an external central controller, wherein the control logic circuitry is configured to control operation of the first transmit/receive path circuitry of the array element;
wherein the control logic circuitry receives control data from the central controller via the first RF combiner network and wherein the first transmit/receive path circuitry at least one of transmits the first RF signals to or receives the first RF signals from the first RF combiner network; and
where the array element further comprises:
a first input coupled to the first transmit/receive path circuitry with a first node coupled between the first input and first transmit/receive path circuitry, the first input configured to receive the control data from the first RF combiner network and to transmit the first RF signals to and receive the first RF signals from the first RF combiner network, and
a first switch coupled between the first node and the control logic circuitry, the first switch configured to selectably couple the control logic circuitry to the first node to receive the control data from the first RF combiner network via the first node, and to selectably isolate the control logic circuitry from the first node when the first transmit/receive path circuitry transmits the first RF signals and receives the first RF signals from the first RF combiner network.

25. An array element for use in a phased array antenna system that includes multiple separate array elements coupled to different antennas, the array element comprising:
first transmit/receive path circuitry configured to be separately coupled to an antenna that is different than an antenna coupled to the first transmit/receive path circuitry of each of the other array elements, the first transmit/receive path circuitry being configured to transmit first RF signals to and receive first RF signals from a first radio frequency (RF) combiner network;
control logic circuitry configured to communicate with an external central controller, wherein the control logic circuitry is configured to control operation of the first transmit/receive path circuitry of the array element;
wherein the control logic circuitry receives control data from the central controller via the first RF combiner network and wherein the first transmit/receive path circuitry at least one of transmits the first RF signals to or receives the first RF signals from the first RF combiner network;
wherein an embedded input address is associated with the control logic circuitry of the array element that is different than an embedded input address associated with control logic circuitry of any other array element of the same phased array system; wherein the control data comprises input address information to address the control data to the control logic circuitry of the array element and wherein the control logic circuitry is configured to accept the control data as valid if the input address matches an embedded address associated with the array element; wherein, during a Data mode, the control logic circuitry receives control data from the central controller via the first RF combiner network; wherein, during a RF mode, the first transmit/receive path circuitry at least one of transmits the first RF signals to or receives the first RF signals from the first RF combiner network; and wherein the control logic circuitry uses the valid control data to control operation of the first transmit/receive path circuitry of the array element;

wherein the array element receives from the external central controller a Mode control signal that switches the array element between Data mode and RF mode;

where the array element further comprises:

second receive path circuitry configured to be separately coupled to an antenna that is different than an antenna coupled to the second receive path circuitry of each of the other array elements, the second receive path circuitry being configured to transmit second RF signals to a second radio frequency (RF) combiner network, wherein the control logic circuitry is configured to control operation of the second receive path circuitry of the array element and wherein the control logic circuitry receives from the external central controller a clock signal via the second RF combiner network and wherein the second receive path circuitry transmits the second RF signals to the second RF combiner network; and where the array element further comprises:

a first input coupled to the first transmit/receive path circuitry with a first node coupled between the first input and first transmit/receive path circuitry, the first input configured to receive the control data from the first RF combiner network and to transmit the first RF signals to and receive the first RF signals from the first RF combiner network, a second input coupled to the second receive path circuitry with a second node coupled between the second input and second receive path circuitry, the second input configured to receive the clock signal from the second RF combiner network and to transmit the second RF signals to the second RF combiner network, a first switch coupled between the first node and the control logic circuitry, the first switch configured to selectably couple the control logic circuitry to the first node to receive the control data from the first RF combiner network via the first node, and to selectably isolate the control logic circuitry from the first node when the first transmit/receive path circuitry transmits the first RF signals and receives the first RF signals from the first RF combiner network, and a second switch coupled between the second node and the control logic circuitry, the second switch configured to selectably couple the second node to the control logic circuitry to receive the clock signal from the second RF combiner network via the second node, and to selectably isolate the control logic circuitry from the second node when the second receive path circuitry transmits the second RF signals to the second RF combiner network.

26. A control interface circuitry configured to control multiple array elements that are each separately coupled to a different antenna of a phased array antenna system, the control interface circuitry comprising:

a first radio frequency (RF) combiner network configured to transmit first RF signals to and receive first RF signals from separate first transmit/receive path circuitry present in each of the different array elements and that is separately coupled to an antenna that is different than an antenna coupled to the first transmit/receive path circuitry of each of the other array elements; and a central controller configured to communicate with separate control logic circuitry present in each of the different array elements, the control logic circuitry of each different given array element being operable to control operation of the separate first transmit/receive path circuitry of the same given array element;

wherein the central controller transfers control data to the separate control logic circuitry present in each different array element via the first RF combiner network and wherein the first RF combiner network at least one of transmits first RF signals to or receives first RF signals from the first transmit/receive path circuitry present in each different array element;

wherein a different embedded input address is associated with a control logic circuitry of each different array element; wherein the control data comprises input address information to address the control data to the control logic circuitry of the different array elements, and wherein the control logic circuitry of each different given array element is configured to accept the control data as valid if the input address matches an embedded address associated with the given array element; and wherein the control logic circuitry of each different given array element uses the valid control data to control operation of the first transmit/receive path circuitry of the given array element;

wherein, during a Data mode, the central controller transfers the control data to the separate control logic circuitry present in each of the different array elements via the first RF combiner network; wherein, during a RF mode, the first RF combiner network at least one of transmits the first RF signals to or receives the first RF signals from the first transmit/receive path circuitry present in each of the different array elements; and wherein the central controller outputs a Mode control signal to each different given array element to switch the given array element between Data mode and RF mode;

wherein the control interface circuitry further comprises a second RF combiner network configured to receive second RF signals from separate second receive path circuitry present in each of the different array elements and that is separately coupled to an antenna that is different than an antenna coupled to the second receive path circuitry of each of the other array elements, wherein, during Data mode, the central controller transfers a clock signal to the separate control logic circuitry present in each of the different array elements via the second RF combiner network and wherein, during RF mode, the second RF combiner network receives the second RF signals from the second receive path circuitry present in each of the different array elements; and where the first RF combiner network has a RF and data signal input/output configured to exchange the first RF signals and the control data with the different array elements, a data signal input/output coupled to exchange the control data with the central controller, and a RF input/output coupled to output the first RF signals from the first RF combiner network that are received from the different array elements and to receive the first RF signals that are provided to the different array elements; where the second RF combiner network has a RF and clock signal input/output configured to exchange the second RF signals and the clock signals with the array elements, a clock signal input coupled to receive clock data from the central controller, and a RF signal output configured to output the second RF signals from the second RF combiner network that are received from the array elements;

where the first RF combiner network is configured to provide constant group delay for the control data exchanged with the array elements; and where the second RF combiner network is configured to provide constant group delay for the clock signals exchanged with the array elements.

* * * * *